United States Patent
Suzuki et al.

(10) Patent No.: US 7,706,327 B2
(45) Date of Patent: Apr. 27, 2010

(54) MOBILE COMMUNICATION SYSTEM AND MOBILE COMMUNICATION TERMINAL

(75) Inventors: Toshihiro Suzuki, Yokohama (JP); Motonari Kobayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1268 days.

(21) Appl. No.: 11/218,599

(22) Filed: Sep. 6, 2005

(65) Prior Publication Data
US 2006/0052121 A1    Mar. 9, 2006

(30) Foreign Application Priority Data
Sep. 7, 2004   (JP)   ............................. 2004-260277

(51) Int. Cl.
H04W 4/00 (2009.01)
H04W 36/00 (2009.01)
H04J 3/24 (2006.01)

(52) U.S. Cl. ................. 370/331; 370/338; 370/349; 455/435.1; 455/436

(58) Field of Classification Search ............ 370/331, 370/338, 349; 455/435.1, 436
See application file for complete search history.

(56) References Cited

U.S. PATENT DOCUMENTS

| | | | | |
|---|---|---|---|---|
| 6,771,666 B2 * | 8/2004 | Barker, Jr. | | 370/475 |
| 6,879,574 B2 * | 4/2005 | Naghian et al. | | 370/338 |
| 6,937,602 B2 * | 8/2005 | Whitehill et al. | | 370/395.54 |
| 6,970,444 B2 * | 11/2005 | Chwieseni et al. | | 370/338 |
| 6,982,982 B1 * | 1/2006 | Barker et al. | | 370/395.54 |
| 7,031,279 B2 * | 4/2006 | Lee et al. | | 370/331 |
| 7,054,646 B2 * | 5/2006 | Naghian | | 455/456.1 |
| 7,072,323 B2 * | 7/2006 | Roberts et al. | | 370/338 |
| 7,254,119 B2 * | 8/2007 | Jiang et al. | | 370/328 |
| 7,349,380 B2 * | 3/2008 | Barker et al. | | 370/349 |
| 2002/0131386 A1 * | 9/2002 | Gwon | | 370/338 |
| 2002/0142771 A1 | 10/2002 | Saifullah et al. | | |
| 2003/0095523 A1 * | 5/2003 | Korus et al. | | 370/338 |
| 2003/0117965 A1 * | 6/2003 | Markki et al. | | 370/254 |
| 2004/0114553 A1 | 6/2004 | Jiang et al. | | |

(Continued)

FOREIGN PATENT DOCUMENTS

EP    1 345 463 A2    9/2003

(Continued)

OTHER PUBLICATIONS

Ryuji Wakikawa, et al., "Global connectivity for IPv6 Mobile Ad Hoc Networks", draft-wakikawa-manet-global v6-02. txt, Nov. 3, 2002, pp. 1-26.

(Continued)

Primary Examiner—Alpus H Hsu
(74) Attorney, Agent, or Firm—Oblon, Spivak, McClelland, Maier & Neustadt, L.L.P.

(57) ABSTRACT

A mobile communication system transfers a packet to a mobile communication terminal forming an adhoc network, through a core network, based on address information of the mobile communication terminal. The address information of the mobile communication terminal includes common information which is changed when a connection point between the adhoc network and the core network is changed, and individual information which is maintained unchanged even when the connection point between the adhoc network and the core network is changed. The packet is configured to be transferred based on the individual information in a communication within the adhoc network.

5 Claims, 7 Drawing Sheets

U.S. PATENT DOCUMENTS

| | | | |
|---|---|---|---|
| 2004/0203787 A1* | 10/2004 | Naghian | 455/437 |
| 2005/0053054 A1* | 3/2005 | Das et al. | 370/352 |
| 2005/0090201 A1* | 4/2005 | Lengies et al. | 455/41.2 |

FOREIGN PATENT DOCUMENTS

| | | |
|---|---|---|
| JP | 10-13910 | 1/1998 |
| JP | 2000-341330 | 12/2000 |
| JP | 2004-104322 | 4/2004 |
| JP | 2004-193844 | 7/2004 |

OTHER PUBLICATIONS

U.S. Appl. No. 11/851,130, filed Sep. 6, 2007, Suzuki, et al.

James D. Solomon, "Mobile IP: The Internet Unplugged", Mobile IP, Chapter 12, Mobility in IP version 6, 1998, pp. 291-321 (with partial English translaiton).

* cited by examiner

MOBILE COMMUNICATION SYSTEM AND MOBILE COMMUNICATION TERMINAL

CROSS REFERENCE TO RELATED APPLICATION

This application is based upon and claims the benefit of priority from the prior Japanese Patent Application No. P2004-260277, filed on Sep. 7, 2004; the entire contents of which are incorporated herein by reference.

BACKGROUND OF THE INVENTION

1. Field of the Invention

The present invention relates to a mobile communication system which transfers, based on address information of a mobile communication terminal, a packet addressed to the mobile communication terminal which forms an adhoc network, through a core network.

The present invention also relates to a mobile communication terminal used in the mobile communication system.

2. Description of the Related Art

Figure 1:
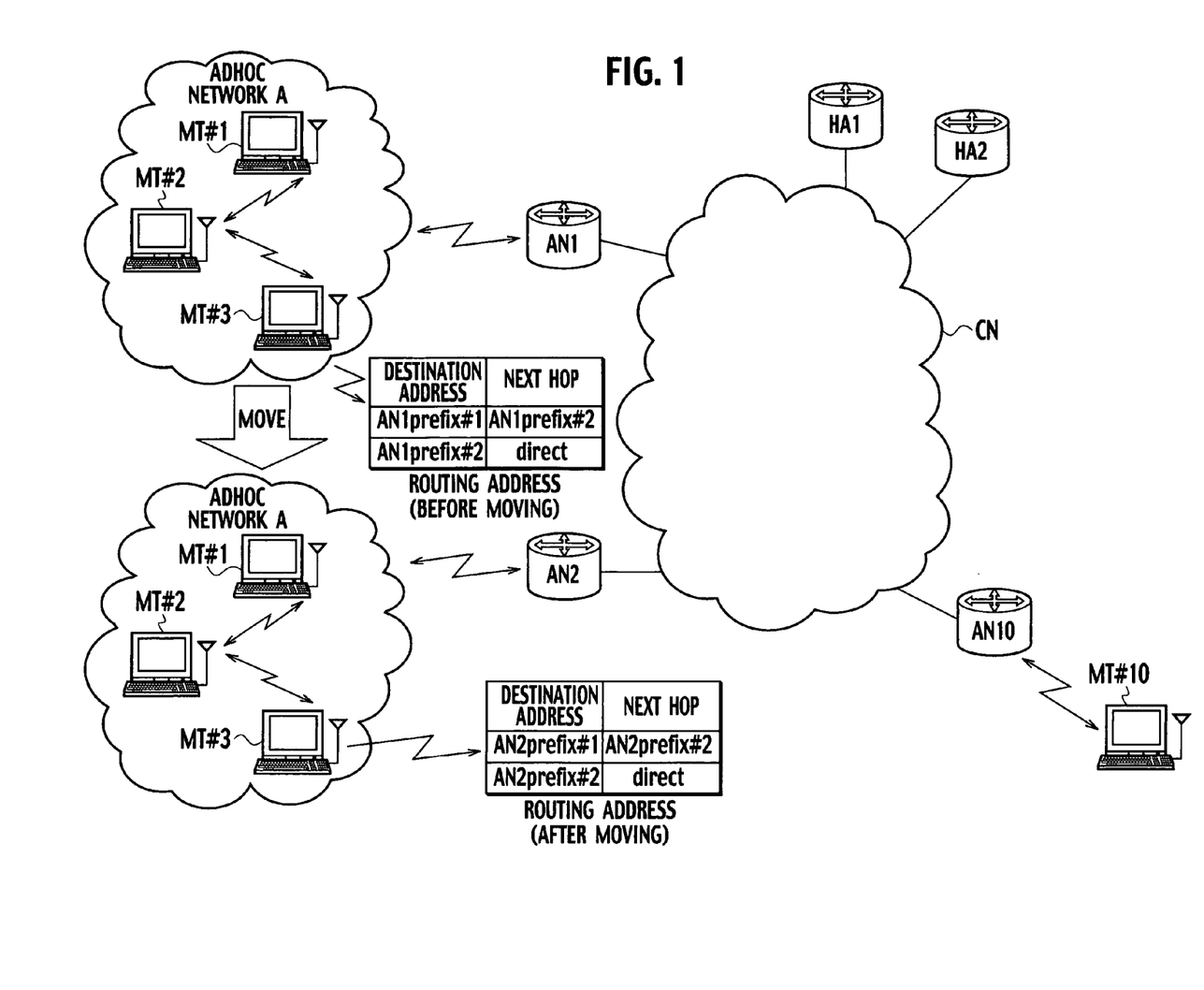
FIG. 1 is a diagram showing a whole configuration of a mobile communication system according to a related art.

FIG. 1 is a diagram showing a whole configuration of a mobile communication system. In the mobile communication system, based on address information of the mobile communication terminals MT#1 to MT3, a packet is addressed and transferred to mobile communication terminals MT#1 to MT#3 which form an adhoc network A, through a core network CN.

Conventionally, "Globalv6[1]" has been proposed as the mobile communication system described above.

In this mobile communication system, each of mobile communication terminals MT manages a home address HoA and a care-of address CoA of the terminal itself, as the address information.

In the mobile communication system, packets are configured to be sent to each of the mobile communication terminals MT based on the home address HoA and the care-of address CoA in communications through a core network.

In the mobile communication system, packets are configured to be transferred to each of the mobile communication terminals MT based on the home address HoA or the care-of address CoA in communications through an adhoc network.

To be more specific, each of the mobile communication terminals MT is configured to transfer packets to other mobile communication terminals MT, in accordance with a routing table which associates a "destination address" with a "next hop", in routing processing within the adhoc network.

In FIG. 1, a routing table stored in a mobile communication terminal MT#3 is shown as a representative of the mobile communication terminals MT within the adhoc network A. Here, both routing addresses before and after the mobile communication terminal MT has been moved are shown.

The care-of address CoA of each of the mobile communication terminals MT includes a prefix and a terminal number. The prefix is assigned by an access node AN connected to the adhoc network to which the mobile communication terminal MT belongs. The terminal number is unique within the adhoc network.

In FIG. 1, when the adhoc network A which is formed by the mobile communication terminals MT#1 to MT#3 is connected to an access node AN1, a care-of address of the mobile communication terminal MT#1 is "AN1prefix#1" including a prefix "AN1prefix" which is assigned by the access node AN1 and a terminal number "#1", a care-of address of the mobile communication terminal MT#2 is "AN1prefix#2" including the above described prefix "AN1prefix" and a terminal number "#2", and a care-of address of the mobile communication terminal MT#3 is "AN1prefix#3" including the above described prefix "AN1prefix" and a terminal number "#3".

However, in the aforementioned mobile communication system, there has been a problem in that, when a handoff occurs while the adhoc network A is formed by the mobile communication terminals MTs, or more specifically, when any one of the mobile communication terminals MT forming the adhoc network A moves, and a connection point between the adhoc network A and the core network CN accordingly is changed from the access node AN1 to another access node AN2, since a care-of address CoA of each of the mobile communication terminals MT is changed, a large amount of recalculation is required to be performed in each of the mobile communication terminals in order to reconstruct a routing table, irrespective of whether topology within the adhoc network A is changed or not.

BRIEF SUMMARY OF THE INVENTION

The present invention has been made considering the problems, and its object is to provide a mobile communication system which makes a large amount of recalculation unnecessary in each of mobile communication terminals MT, even when a handoff occurs in a state where an adhoc network A is formed, and to provide a mobile communication terminal thereof.

A first aspect of the present invention is summarized as a mobile communication system which transfers a packet to a mobile communication terminal forming an adhoc network, through a core network, based on address information of the mobile communication terminal. The address information of the mobile communication terminal includes common information which is changed when a connection point between the adhoc network and the core network is changed, and individual information which is maintained unchanged even when the connection point between the adhoc network and the core network is changed; and the packet is configured to be transferred based on the individual information in a communication within the adhoc network.

A second aspect of the present invention is summarized as a mobile communication terminal which is capable of forming an adhoc network. The mobile communication terminal includes: an address information management unit configured to manage address information including common information which is changed when a connection point between the adhoc network and a core network is changed, and individual information which is maintained unchanged even when the connection point between the adhoc network and the core network is changed; a core network communication unit configured to transfer a packet, based on the address information, in a communication through the core network; and an adhoc network communication unit configured to transfer a packet, based on the individual information, in a communication within the adhoc network.

DETAILED DESCRIPTION OF THE INVENTION (A Configuration of a Mobile Communication System According to a First Embodiment of the Invention)

A configuration of a mobile communication system according to a first embodiment of the invention will be described with reference to FIGS. 2 to 4.

Figure 2:
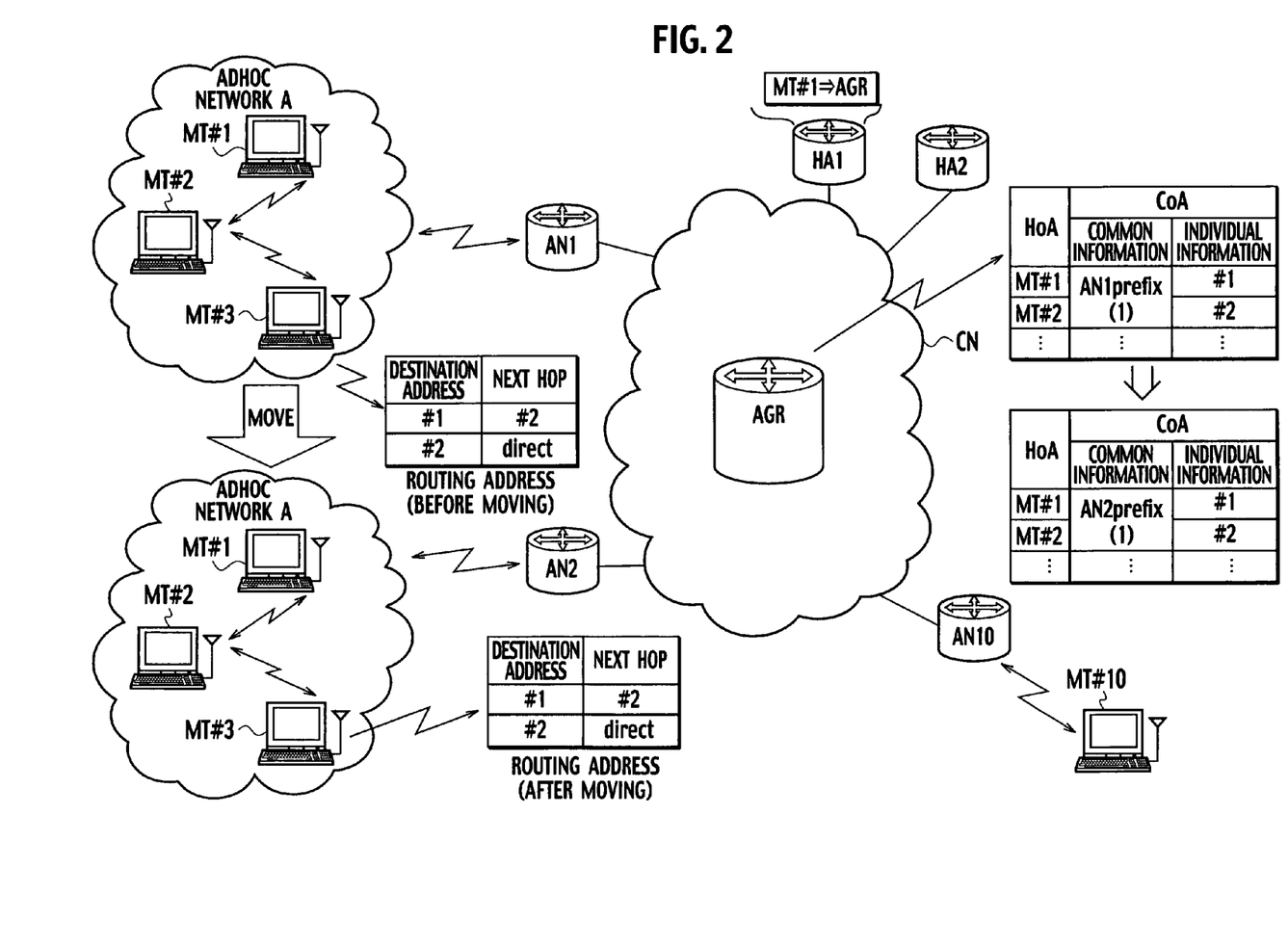
FIG. 2 is a diagram showing a whole configuration of a mobile communication system according to a first embodiment of the present invention.

A mobile communication system according to this embodiment, as shown in FIG. 2, includes a core network CN, a plurality of access nodes AN1, AN2, and AN10, a mobility management router AGR, and home agents HA1 and HA2.

In the example shown in FIG. 2, an adhoc network A, which is formed by a plurality of mobile terminals MT#1 to MT#3, moves from the condition in which the adhoc network A is connected to the access node AN1 to the condition in which the adhoc network A is connected to the access node AN2.

In the mobile communication system according to this embodiment of the invention, as shown in FIG. 2, packets are addressed and transferred to each of the mobile communication terminals MT#1 to MT#3 which forms the adhoc network A, through the core network CN and based on address information (a care-of address CoA) of each of the mobile communication terminals MT#1 to MT#3.

Here, the care-of address CoA of each of the mobile communication terminals MT#1 to MT#3 includes common information and individual information.

The common information is designed to be changed, when a connection point (the access node AN) between the adhoc network A and the core network CN is changed.

The individual information, on the other hand, is designed not to be changed, even when the connection point (the access node AN) between the adhoc network A and the core network CN is changed.

The common information is designed to be associated with the access node AN1 or AN2 to which the adhoc network A is connected.

The individual information, on the other hand, is designed not to be associated with the access node AN1 or AN2 to which the adhoc network A is connected.

Specifically, when the adhoc network A is connected to the access node AN1, the care-of address CoA of the mobile communication terminal MT#1 is "AN1prefix(1) (common information)+#1 (individual information)".

When the adhoc network A is connected to the access node AN2, the care-of address CoA of the mobile communication terminal MT#1 is "AN2prefix(1) (common information)+#1 (individual information)".

As mentioned above, the common information (AN1prefix(1) or AN2prefix(1)) is designed to be changed, depending on whether the adhoc network A is connected to the access node AN1, or to the access node AN2.

Specifically, the access node AN is configured to assign CoP (Care-of-Prefix) to the adhoc network A, based on broadcast information (Agent Advertisement).

Each of the mobile communication terminals, which forms the adhoc network A, is configured to manage the assigned CoP as common information.

As shown in FIG. 2, packets sent from a mobile communication terminal MT#10 are addressed and transferred, through the home agent HA1 or HA2, and a mobility management router AGR, to any one of the mobile communication terminals MT#1 to MT#3 within the adhoc network A.

For example, packets sent from the mobile communication terminal MT#10 and addressed to the mobile communication terminal MT#1 (a home address HoA of the mobile communication terminal MT#1 is included as a destination address) are transferred to the home agent HA1 of the mobile communication terminal MT#1.

The home agent HA1 is configured to refer to a routing table by using the home address HoA of the mobile communication terminal MT#1 (a destination address), and to transfer the packets addressed to the mobile communication terminal MT#1, to the mobility management router AGR.

The mobility management router AGR is configured to set a care-of address CoA of the mobile communication terminal MT#1 as a destination address of the packets addressed to the mobile communication terminal MT#1.

Next, the mobility management router AGR is configured to transfer the packets addressed to the mobile communication terminal MT#1, through the access node AN1 or AN2, to the mobile communication terminal MT#1 which forms the adhoc network A.

Here, with reference to FIG. 3, a configuration of a mobile communication terminal MT according to this embodiment will be described.

Figure 3:
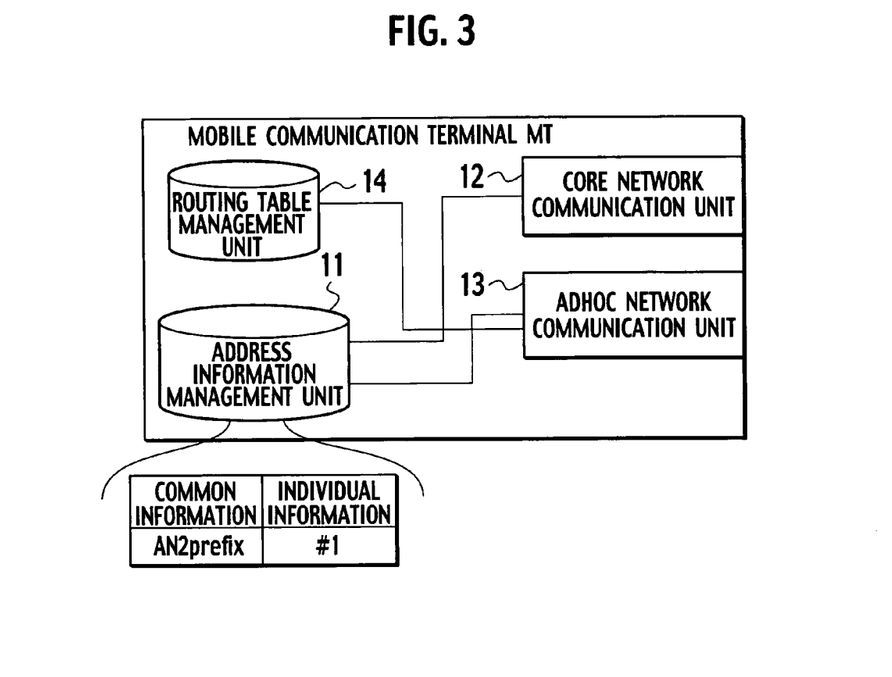
FIG. 3 is a functional block diagram of the mobile communication terminal according to the first embodiment of the present invention.

As shown in FIG. 3, the mobile communication terminal MT includes an address information management unit 11, a core network communication unit 12, an adhoc network communication unit 13, and a routing table management unit 14.

The mobile communication terminal MT according to this embodiment is configured to be capable of forming the adhoc network A, by directly communicating with another mobile communication terminal.

The address information management unit 11 is configured to manage a care-of address (address information) CoA of the mobile communication terminal MT itself which includes the common information and the individual information.

In the example shown in FIG. 3, the address information management unit 11 is configured to manage "AN2prefix(1) (common information)+#1 (individual information)" as a care-of address.

In this case, the mobile communication terminal MT is assumed to be connected to the access node AN2. In other words, the adhoc network A formed by the mobile communication terminals MT is assumed to be connected to the access node AN2.

The core network communication unit 12 is configured to transfer packets based on the care-of address (address information) CoA of each of the communication terminals MT, in communications through the core network CN.

For example, the core network communication unit 12 is configured to receive a packet whose destination address is "AN2prefix(1) (common information)+#1 (individual information)", and which is received through the core network CN, as one which is addressed to itself.

Furthermore, the core network communication unit 12 is configured to send update information (Binding Update) to the mobility management router AGR, when detecting that the adhoc network A has moved, specifically, when the access node to which the adhoc network A is connected has been changed.

The update information is to notify that the care-of address CoA of the mobile communication terminal MT itself has been changed.

It should be noted that, since the individual information is still maintained unchanged even in this case, it is sufficient that the update information sent to the mobility management router AGR is designed to include identification information of the mobile communication terminal MT (for example, a home address of the mobile communication terminal MT) and the common information obtained after the care-of address CoA of the mobile communication terminal MT has been changed.

Still furthermore, the core network communication unit 12 is configured to receive broadcast information which is sent from the access node AN.

The broadcast information includes CoP. The CoP has been assigned to the adhoc network A, by the access node to which the adhoc network A is connected.

The adhoc network communication unit 13 is configured to transfer packets, based on the individual information, in communications within the adhoc network A.

Specifically, the adhoc network communication unit 13 is configured to refer to a routing table which is managed by the routing table management unit 14, and to transfer the packets.

Further, the adhoc network communication unit 13 is configured to receive a packet whose destination address is "#1 (individual information)", as a packet addressed to itself, within the adhoc network A.

The adhoc network communication 13 does not use the common information in communications within the adhoc network A. Therefore, even when the adhoc network A moves and the common information is accordingly changed, it is possible to continue communications within the adhoc network A without performing, for example, update of a routing table which manages a care-of address of another communication terminal.

Specifically, as shown in FIG. 2, when the adhoc network A has moved and the common information has been accordingly changed (for example, AN1prefix(1) to AN2prefix(1)), the routing table is not be changed even after the adhoc network A has moved.

The adhoc network communication unit 13 is configured to perform processing concerning communications within the adhoc network such as those to join the adhoc network A and to leave the adhoc network A.

The routing table management unit 14 is configured to manage a routing table within the adhoc network A.

The routing table is designed to associate a "destination address" with a "next hop". In the "destination address", the individual information of an addressed mobile communication terminal is set. In the "next hop", the individual information of a mobile communication terminal to which the packet is to be transferred is set.

FIG. 2 shows, as a representative of the mobile communication terminals MT within the adhoc network A, routing tables stored in the mobile communication terminal MT#3 (routing tables for both before and after the mobile communication terminal MT#3 has been moved).

Here, with reference to FIG. 4, a configuration of the mobility management router AGR will be described.

Figure 4:
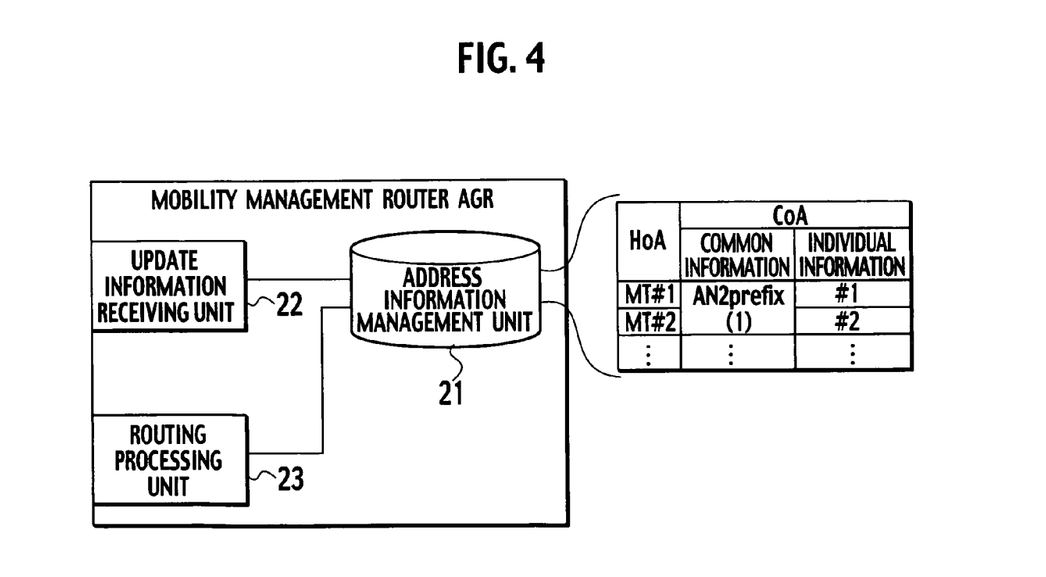
FIG. 4 is a functional block diagram of a mobility management router according to the first embodiment of the present invention.

As shown in FIG. 4, the mobility management router AGR includes an address information management unit 21, an update information receiving unit 22, and a routing processing unit 23.

The address information management unit 21 is configured to manage the home address HoA and the care-of address CoA of all of the mobile communication terminals MT which are capable of communicating through the core network CN.

Specifically, the address information management unit 21 is configured to associate the home address HoA of each of the mobile communication terminals MT (which may be replaced with an identification information of each of the mobile communication terminals MT) with the care-of address CoA of each of the mobile communication terminals MT, and to store both of the addresses.

In the example shown in FIG. 4, the address information management unit 21 is configured to manage a care-of address CoA of the mobile communication terminal MT#1, a care-of address of the mobile communication terminal MT#2, and the like.

The care-of address CoA of the mobile communication terminal MT#1 includes "the common information=AN2prefix(1)" and "the individual information=#1", whereas the care-of address CoA of the mobile communication terminal MT#2 includes "the common information=AN2prefix(1)" and "the individual information=#2".

Furthermore, the address information management unit 21 is configured to change the care-of address of the mobile communication terminal MT, by changing the common information which constructs the care-of address CoA of the mobile communication terminal MT that is managed by the address information management unit 21, based on the update information which is sent from each of the mobile communication terminals MT.

The update information receiving unit 22 is configured to receive various kinds of information such as registration information which includes a care-of address sent from a mobile communication terminal MT which has initiated to join the adhoc network A, and the update information sent from any of mobile communication terminals MT.

The routing processing unit 23 is configured to refer to the address information management unit 21, and to transfer packets to a mobile communication terminal MT in the adhoc network A, through the core network.

In the example shown in FIG. 4, the routing processing unit 23 is configured to receive packets which are sent from a mobile communication terminal MT#10 through an access node AN10, and to transfer the packets to the mobile communication terminal MT#1 through the access node AN2.

(Operations of the Mobile Communication System According to this Embodiment)

Figure 5:
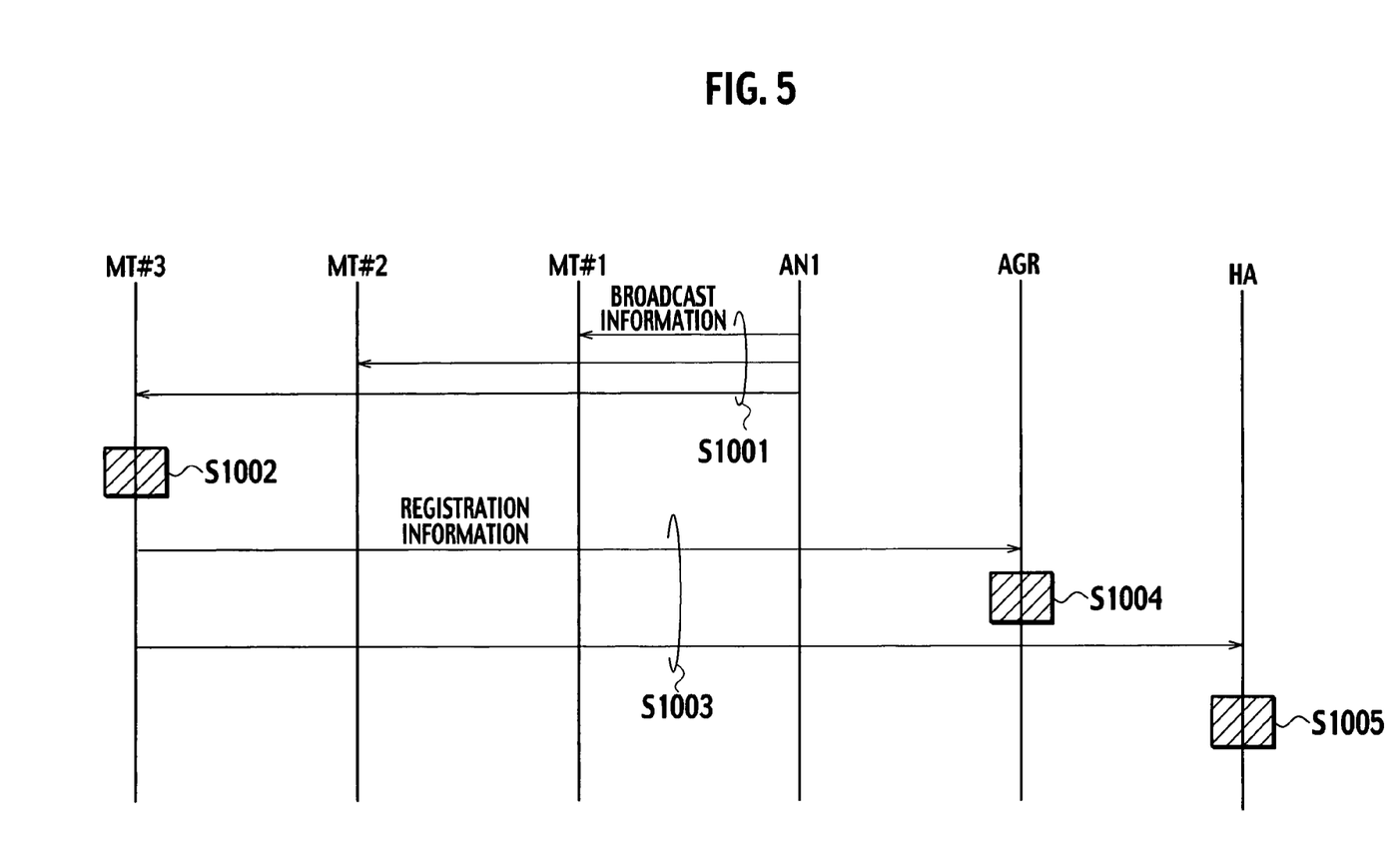
FIG. 5 is a sequence diagram showing operations of the mobile communication system according to the first embodiment of the present invention.
Figure 6:
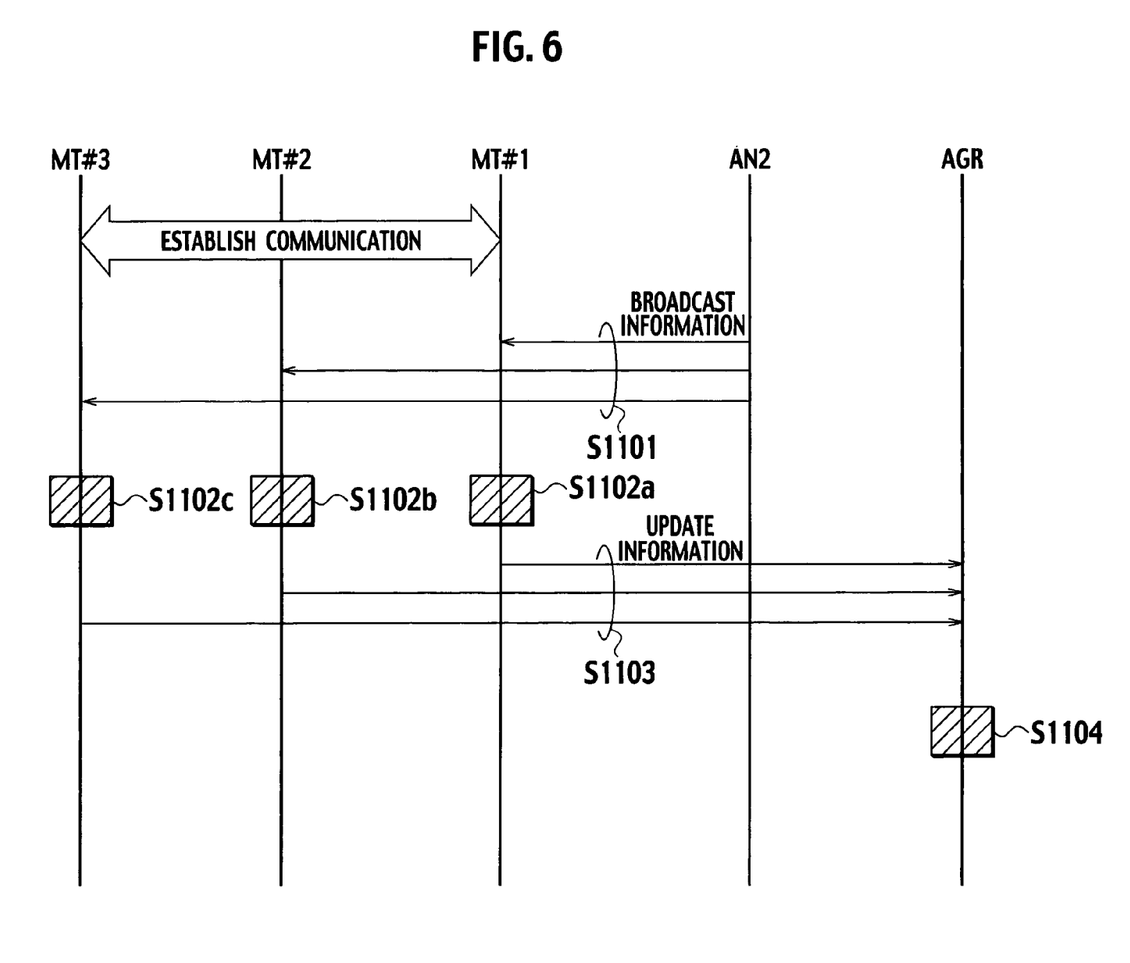
FIG. 6 is a sequence diagram showing operations of the mobile communication system according to the first embodiment of the present invention.

Operations of the mobile communication system according to this embodiment will be described with reference to FIGS. 5 and 6.

First, with reference to FIG. 5, operations in the mobile communication system according to this embodiment will be described, in a case where the mobile communication terminal MT#3 initiates communications. The mobile communication terminal MT#3 is within the adhoc network A which is dependent on the Proactive routing protocol.

In step S1001, the access node AN1 periodically sends the common information (AN1prefix(1)) and the broadcast information containing an address of the mobility management router AGR.

In step S1002, when the mobile communication terminal MT#3 is going to communicate with a communication terminal existing out of the adhoc network A, the mobile communication terminal MT#3 generates a care-of address CoA of the mobile communication terminal MT#3 itself, based on the received broadcast information.

In step S1003, the mobile communication terminal MT#3 sends registration information which includes the care-of address CoA of the mobile communication terminal MT#3 itself and a home address HoA of the mobile communication terminal MT#3 itself, to the mobility management router AGR and a home agent HA.

In step S1004, the mobility management router AGR, in response to the registration information sent from the mobile communication terminal MT#3, initiates to manage the care-of address CoA and the home address HoA of the mobile communication terminal MT#3.

In step S1005, the home agent HA, in response to the registration information sent from the mobile communication terminal MT#3, initiates to manage an address of the mobility management router AGR, as the care-of address CoA of the mobile communication terminal MT#3.

Secondly, with reference to FIG. 6, change operations of the care-of address CoA will be described, in a case where the adhoc network A has moved, in the mobile communication system according to this embodiment.

Here, it is assumed that the mobile communication terminals MT#1 to MT#3 form the adhoc network A, and communicate with each other.

In step S1101, an access node AN2 to which the mobile communication terminals MT#1 to MT#3 have moved, sends common information (AN2prefix(1)) and broadcast information to all of the mobile communication terminals MT#1 to MT#3 within the adhoc network A. The common information here is assigned to the adhoc network A. The broadcast information contains an address of the mobility management router AGR.

In steps S1102a to S1102c, the mobile communication terminals MT#1 to MT#3 change the common information (AN1prefix(1)) of the mobile communication terminals MT#1 to MT#3 to another common information (AN2prefix(1)) included in the broadcast information which has been received from the access node AN2. The common information (AN1prefix(1)) here is managed by the mobile communication terminals themselves.

In step S1103, the mobile communication terminals MT#1 to MT#3 send the update information including the changed common information (AN2prefix(1)), to the mobility management router AGR.

In step 1104, the mobility management router AGR changes the common information (AN1prefix(1)) to another common information (AN2prefix(1)). The common information (AN1prefix(1)) constructs the care-of address CoA of the mobile communication terminals MT#1 to MT#3 within the adhoc network A. The common information (AN2prefix(1)) is included in the update information which has been received from the mobile communication terminals MT#1 to MT#3. As a result, a handoff processing of the mobile communication terminals MT#1 to MT#3 will be completed.

Incidentally, the present invention is also applicable to a case where the Reactive routing protocol is performed.

(Operations and Effects of the Mobile Communication System According to this Embodiment)

According to this embodiment, the adhoc network communication unit 13 of the mobile communication terminal MT performs routing processing within the adhoc network A, based on the individual information which is maintained unchanged even when the adhoc network A has moved.

Therefore, when a handoff occurs in a state where the adhoc network A is formed, although the care-of addresses CoA of all of the mobile communication terminals MT are accordingly changed, a large amount of recalculation for routing within the adhoc network A is not necessary.

Also, according to this embodiment, only routing processing based on the individual information which will not be changed even when the adhoc network has moved, operates.

Therefore, even when a handoff occurs in a state where the adhoc network is formed, a large amount of recalculation is not necessary in each of the mobile communication terminals.

(A Mobile Communication System According to a Second Embodiment of the Present Invention)

Figure 7:
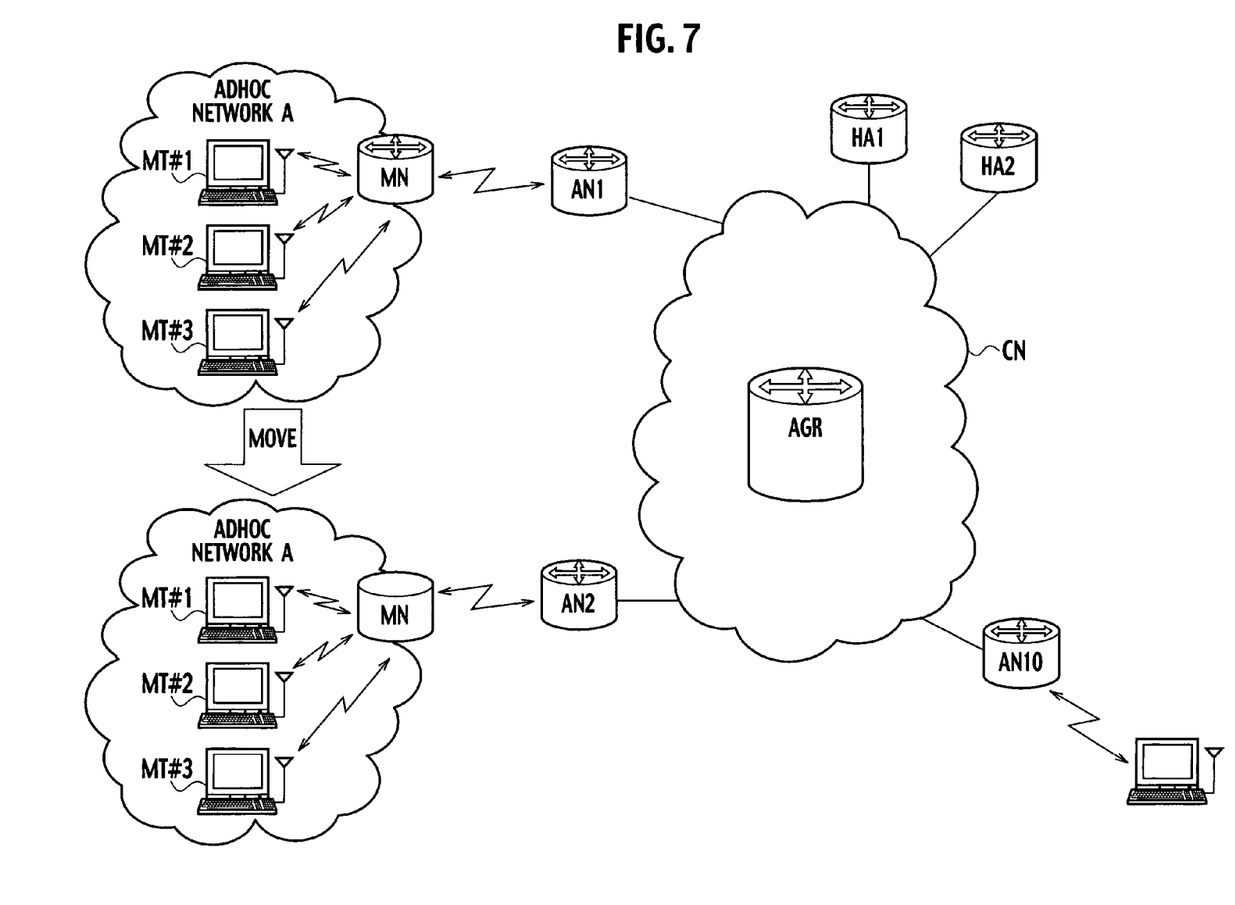
FIG. 7 is a diagram showing a whole configuration of a mobile communication system according to a second embodiment of the present invention.
Figure 8:
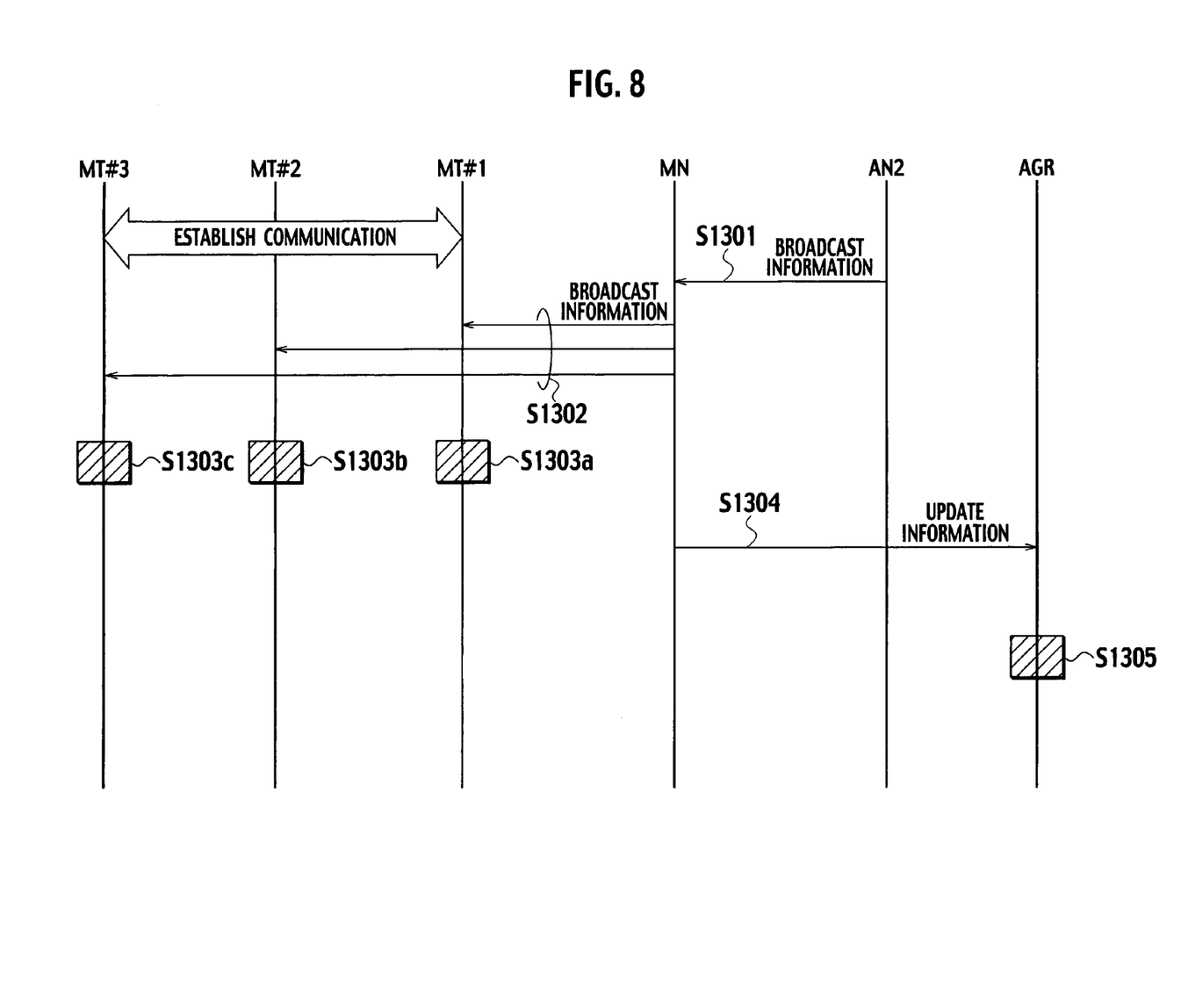
FIG. 8 is a sequence diagram showing operations of the mobile communication system according to the second embodiment of the present invention.

With reference to FIGS. 7 and 8, a mobile communication system according to a second embodiment of the present invention will be described.

Hereinafter, the mobile communication system according to this embodiment will be described, mainly by describing differences thereof from the mobile communication system according to the aforementioned first embodiment.

As shown in FIG. 7, the mobile communication system according to the second embodiment differs from the mobile communication system according to the aforementioned first embodiment in including a mobile node MN which manages an adhoc network A.

The mobile node MN functions as an interface between the mobile communication terminals MT within the adhoc network A and an access node AN.

According to the second embodiment, the common information is an address of the mobile node MN which is assigned by the access node AN to which the mobile node MN is connected.

The individual information is an address of the mobile communication terminal MT assigned by the mobile node MN which manages the adhoc network A.

Specifically, when the adhoc network A is connected to the access node AN1, the address information (care-of address CoA) of the mobile communication terminal MT#1 is "AN1prefixMN (common information)+MNprefix#1 (individual information)".

When the adhoc network A is connected to the access node AN2, the address information (care-of address CoA) is "AN2prefixMN (common information)+MNprefix#1 (individual information)".

Likewise, when the adhoc network A is connected to the access node AN1, the address information (care-of address CoA) of the mobile communication terminal MT#2 is "AN1prefixMN (common information)+MNprefix#2 (individual information) ".

When the adhoc network A is connected to the access node AN2, the address information (care-of address CoA) of the mobile communication terminal MT#2 is "AN2prefixMN (common information)+MNprefix#2(individual information)".

Also, when the mobile node MN detects that the adhoc network A has moved, as the representative of all the mobile communication terminals MT#1 to MT#3 within the adhoc network A, the mobile node MN is configured to notify the mobility management router AGR of the update information concerning the care-of address CoA of all of the mobile communication terminals MT#1 to MT#3 within the adhoc network A.

Incidentally, in the mobile communication system according to the second embodiment, a representative mobile communication terminal (for example, the mobile communication terminal MT#1) within the adhoc network A may be configured to function as the mobile node MN.

With reference to FIG. 8, change operations of the care-of address will be described as follows, in a case where the adhoc network A has moved, with regard to the mobile communication system in the second embodiment.

Here, it is assumed that the mobile communication terminals MT#1 to MT#3 form the adhoc network A, and communicate with each other.

In step S1301, an access node AN2 to which the adhoc network A has moved sends the broadcast information including the common information (AN2prefixMN) which is assigned to a mobile node MN, to the mobile node MN which manages the adhoc network A.

In step S1302, the mobile node MN changes the common information (AN1prefixMN) which constructs the care-of address of the mobile communication terminal MT within the adhoc network A, to another common information (AN2prefixMN) included in the broadcast information which has been received from the access node AN2.

Next, the mobile node MN sends the broadcast information including the changed common information (AN2prefixMN), to all the mobile communication terminals MN#1 to MN#3 within the adhoc network A.

In steps S1303a to S1303c, the mobile communication terminals MT#1 to MT#3 change the common information (AN1prefixMN) which is managed by and belongs to each mobile communication terminal itself, to another common information (AN2prefixMN) included in the broadcast information which has been received from the mobile node MN.

Here, the mobile communication terminals MT#1 to MT#3 are configured not to send the update information concerning the care-of address CoA, to the mobility management router AGR.

In step S1304, the mobile node MN sends, to the mobility management router AGR, the update information for notifying that the adhoc network A has moved, specifically, the care-of addresses of the mobile communication terminals MT#1 to MT#3 within the adhoc network A have been changed (AN1prefixMN to AN2prefixMN).

In step S1305, the mobility management router AGR changes the common information (AN1prefixMN) which constructs the care-of address CoA of the mobile communication terminals MT#1 to MT#3 within the adhoc network A, to another common information (AN2prefixMN) included in the update information which has been received from the mobile communication terminals MT#1 to MT#3.

As a result, a handoff processing of the mobile communication terminals MT#1 to MT#3 within the adhoc network A will be completed.

As mentioned above, according to the invention, a mobile communication system and a mobile communication terminal can be provided which do not require a large amount of recalculations in each of the mobile communication terminals MT, even if a handoff occurs in a state that the adhoc network A is formed.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile communication system which transfers a packet to a mobile communication terminal forming part of an adhoc network which includes a plurality of mobile communication terminals, through a core network, based on address information of the mobile communication terminal, wherein a care-of address of the address information of the mobile communication terminal includes common information which is changed when a connection point between the adhoc network and the core network is changed, and individual information which is maintained unchanged even when the connection point between the adhoc network and the core network is changed; and the packet is configured to be transferred between at least two of the plurality of mobile communication terminals within the adhoc network based on the individual information and not the common information, independent of whether the adhoc network moves to a new connection point between the adhoc network and the core network.

2. A mobile communication terminal which is capable of forming part of an adhoc network which includes a plurality of mobile communication terminals, comprising:

an address information management unit configured to manage a care-of address of address information including common information which is changed when a connection point between the adhoc network and a core network is changed, and individual information which is maintained unchanged even when the connection point between the adhoc network and the core network is changed;

a core network communication unit configured to transfer a packet, based on the care of address of address information, in a communication through the core network;

an adhoc network communication unit configured to transfer a packet to another of the plurality of mobile communication terminals within the adhoc network, based on the individual information and not the common information, independent of whether the adhoc network moves to a new connection point between the adhoc network and the core network; and a routing table management unit configured to store a routing table which associates the individual information of a destination mobile communication terminal with the individual information of a next hop mobile communication terminal.

3. A method of operating a mobile communication system to transfer a packet to a mobile communication terminal forming a part of an adhoc network through a core network, comprising:

periodically sending, common information identifying an access node from the access node in combination with broadcast information containing an address of a mobility management router operated in the core network;

generating, when the mobile communication terminal is going to communicate with the communication terminal existing out of the adhoc network, a care-of address of the mobile communication terminal itself based on the received broadcast information;

sending from the mobile communication terminal registration information including the care-of address of the mobile communication terminal itself and a home address of the mobile communication terminal itself to the mobility management router, and a home agent of the mobile communication terminal;

initiating at the mobility management router, in response to the registration information sent from the mobile communication terminal, to manage the care-of address and the home address of the mobile communication terminal; and initiating at the home agent, in response to the registration information sent from the mobile communication terminal, to manage the address of the mobility management router as the care-of address of the mobile communication terminal;

the method further comprising:

in response to a connection point between the adhoc network and the core network changing, changing the common information and maintaining unchanged individual information of the care-of address of the mobile communication terminal.

4. A method according to claim 3, wherein the common information of the care-of address of the mobile communication terminal is changed, in response to the connection point between the adhoc network and the core network changing, further comprising:

sending, by an access node to which the adhoc network has moved, a common information identifying the new access node and broadcast information to all mobile communication terminals within the adhoc network, wherein the broadcast information contains an address of the mobility management router;

changing at the mobile communication terminals the previous common information identifying the previous access node to a new common information, identifying the new access node as received with the broadcast information; and sending from the mobile communication terminals update information including the changed common information to the mobility management router.

5. A method according to claim 4, further comprising:

changing at the mobility management router the common information identifying the previous access node to the new common information identifying the new access node for construction of a care-of address of the mobile communication terminals in the adhoc network.

* * * * *